(12) United States Patent
Smith

(10) Patent No.: US 6,194,662 B1
(45) Date of Patent: Feb. 27, 2001

(54) ADJUSTABLE COVER FOR OUTDOOR ELECTRICAL SUBSTATIONS

(75) Inventor: Donald C. Smith, Cranford, NJ (US)

(73) Assignee: Public Service Electric and Gas Company, Newark, NJ (US)

( * ) Notice: Subject to any disclaimer, the term of this patent is extended or adjusted under 35 U.S.C. 154(b) by 0 days.

(21) Appl. No.: 09/179,720

(22) Filed: Oct. 27, 1998

(51) Int. Cl.[7] ........................................ H02G 3/14
(52) U.S. Cl. ................... 174/66; 174/67; 220/241; 220/242
(58) Field of Search .................. 174/66, 67, 53, 174/57, 58; 220/241, 242, 3.8, 3.7; 439/135; D13/177

(56) References Cited

U.S. PATENT DOCUMENTS

| | | | |
|---|---|---|---|
| 4,780,573 | * 10/1988 | Own | 174/66 |
| 5,228,584 | * 7/1993 | Williams, Jr. | 220/3.8 |
| 5,696,350 | * 12/1997 | Anker | 174/66 |
| 5,929,379 | * 7/1999 | Reiner et al. | 174/66 |
| 5,981,875 | * 11/1999 | Kesler et al. | 174/66 |

* cited by examiner

Primary Examiner—Kristine Kincaid
Assistant Examiner—Dhiru R Patel
(74) Attorney, Agent, or Firm—W. Patrick Quast, Esq.

(57) ABSTRACT

An adjustable cover for outdoor electrical substations is disclosed. The traditional metal cover for these installations is capped with length adjustable fiberglass reinforced plastic cover pieces. The cover pieces slide over one another in an interlocking relationship to accommodate the top surfaces of a variety of existing electrical substations. Once in place the covers are maintained in the same interlocking plane to the top surface of the substation with their cooperating flanges insuring positive prevention of weather related water damage to sensitive electrical components. End caps further enhance the degree of water damage protection.

28 Claims, 3 Drawing Sheets

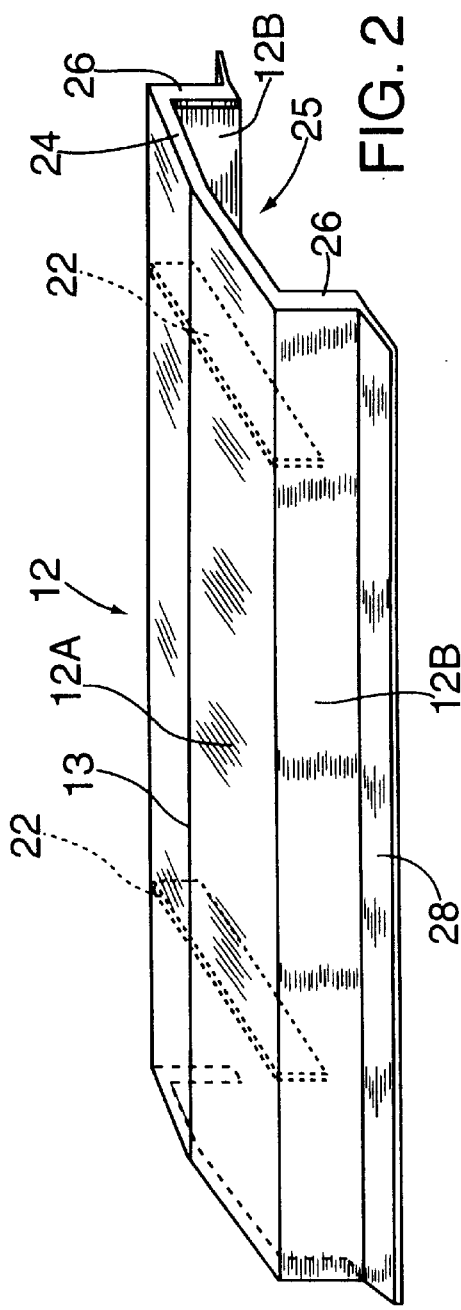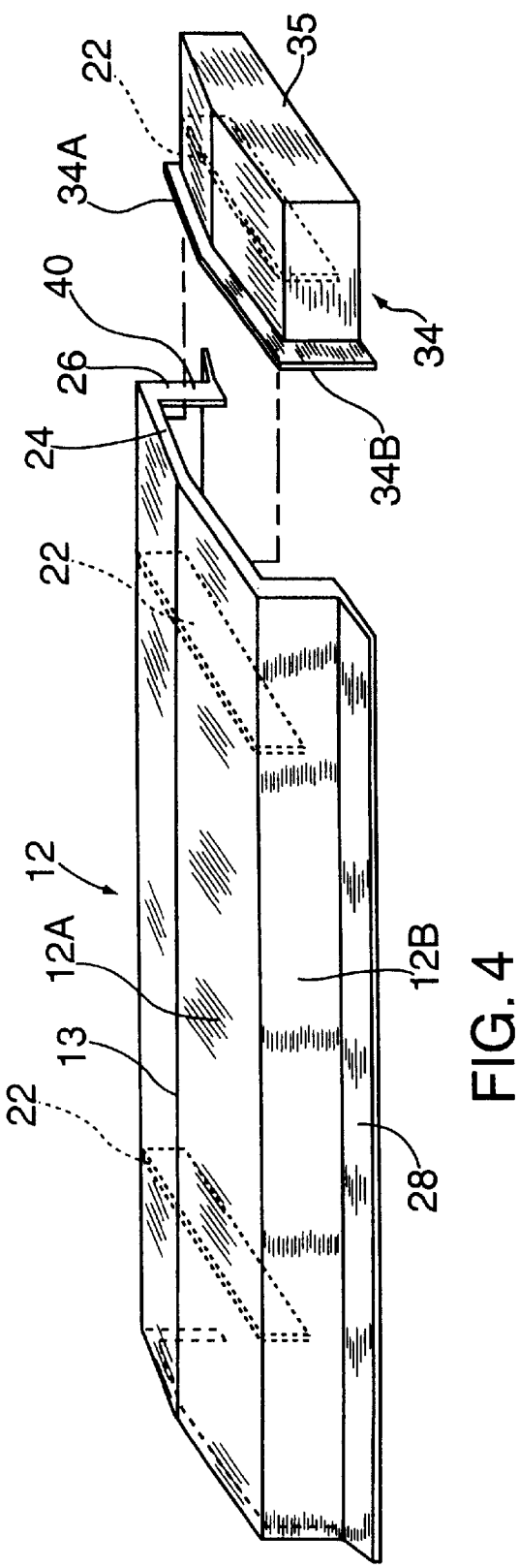

ADJUSTABLE COVER FOR OUTDOOR ELECTRICAL SUBSTATIONS

BACKGROUND

This invention relates to covers for electrical substations, and in particular to covers for existing electrical substations to prevent weather related damage to components of these substations.

Electrical power transmission comprises a variety of systems for transmitting power from one facility to another. Various functions include switching stations, step down transformers, and so on. Equipment contained in these substations includes circuit breakers, devices for switching equipment in and out of service, lightning arrestors, and sophisticated abnormality control systems. Frequently the most practical or only location for electrical substations is the outdoors. One of the most important factors in electrical reliability then becomes the elimination of water from penetrating into these outdoor facilities.

Many attempts have been made, of course, to overcome the effects of weather on sensitive electrical and electronic components to be located outdoors, For example, in U.S. Pat. No. 2,952,799, issued Sep. 13, 1960, an outdoor metal clad switchgear structure is disclosed. In this structure, a basic unit 10 (FIG. 1) encloses a circuit breaker cell 13. An enclosed service isle 11 (FIG. 13) provides protection for maintenance personnel from the weather while servicing the equipment, and access to electrical components, such as a circuit breaker, is provided without exposure of the components to the outdoor weather. Again, in U.S. Pat. No. 3,723,824, issued Mar. 27, 1973, a telescoping outdoor switchgear assemblage is described. This patent teaches "the switch gear is so constructed that the aisle section and switchboard section may be telescoped over one another during shipment, thereby to reduce volume and shipping costs while simplifying erection in the field.", col. 1, lines 33–38. U.S. Pat. No. 4,327,530, issued May 4, 1982, discloses an enclosure for weatherproofing electrical equipment such as outside plant telephone electronics. In this invention a mushroom shaped hood 11 (FIG. 1) is supported by a spring-driven lifting mechanism 12 which automatically raises the hood above the level of the enclosed electronic equipment when the lifting mechanism is unlatched. In U.S. Pat. No. 5,136,463, issued Aug. 4, 1992, a universal enclosure for housing outside plant equipment in order to protect the equipment from harmful weather effects is disclosed. An electrical panel mounted internally of the universal enclosure, but accessible from the exterior of the universal enclosure, facilitates servicing the equipment while maintaining craft separation. U.S. Pat. No. 5,435,641, issued Jul. 25, 1995, teaches a cabinet 1 (FIG. 1) having a unitary or monobloc body of pressed construction, such a glass fiber-reinforced polyester, to protect electrical equipment exposed to the weather.

While the above noted inventions provide useful devices and methods for protecting various electrical systems from weather related harmful effects, they do not envision the adjustable cover for pre-existing electrical substations of the present invention.

It is therefore a primary object of the present invention to provide a protective cover for outdoor electrical substations.

An additional object of the invention is to provide a linear adjustable, telescoping cover for protecting pre-existing outdoor bus ducts from weather related deleterious effects.

A further object of the invention is to provide a telescoping construction to eliminate any type of seam on the horizontal or vertical by the use of overlapping flanges at each end of the weather protective cover.

Still another object of the invention is to provide an adjustable, weather resistant fiber glass reinforced plastic cover for pre-existing electrical substations.

Yet another object of the invention is to provide a weather protective cover to accommodate virtually all designs of 13 kV bus ducts.

An additional object of the invention is to provide a weather protective cover to accommodate virtually all designs of 4 kV class "C" switchgear.

SUMMARY

These and other objects are obtained with the adjustable cover for electrical substations of the present invention.

Typically, when protecting outdoor positioned electrical equipment from weather related damage metal enclosures of various types are employed. Over time rain and snow deposited water will often find its destructive way into sensitive electrical substation components. Causes for these structural failures range from outright corrosion of the metal closure to pin hole leaks developing at welded junctures. These water leaks are a constant source of electrical failure problems, necessitating frequent maintenance and repair procedures. Attempts at repair, including re-welding leaking joints, or re-caulking these joints are often, at best, a temporary correction for the problem.

It occurred that placing a suitable adjustable cover structured to be free of potential areas for weather leakage over outdoor located electrical substations would significantly improve reliability of these electrical transmitting stations while lowering the necessity for frequent inspections. Instead of using corrosion prone metal as a cover, a fiberglass reinforced plastic, such as fiberglass reinforced polyester, was selected as the material of fabrication for the covers. To further aid longevity of the covers a UV resistant gel coat, such as ANSI-61, can be applied to their exterior surfaces. Electrical substations such as, for example, 13 kV bus ducts or 4 kV class "C" switchgear, often have similar shapes including extended length in relation to width, making possible a relatively small number of adjustable covers for a wide range of substations. A main cover piece can measure, for example, approximately 11½' by approximately 14" in height. The cover has a generally, slightly gabled cover top surface, and downwardly projecting left and right side walls, defining a C shaped opening at both ends of the cover. An approximate 2" wide flange extends downwardly from the top surface, and inwardly from each side, at each end of the cover. A similar 2" wide flange extends outwardly at the base of the left and right side walls. To further aid water run off, the cover top surface section gently slopes to the left and right along its center line running the length of the cover. A pair of support bars, each bar being placed a spaced distance from each end of the main cover, further aids the utility of the cover. The support bars for covers for existing substation designs measure approximately 5" in height and are connected to each end of the bar at the sides of the cover. The purpose of the support bars is to provide structural support for the cover; and to permit clearance of protrusions extending above the top surface of the electrical substation being covered. These insure resistance to wind forces and provide easy positioning on the top surface of the substation irrespective of these protrusions.

The above described main cover piece can be used as an effective water shedding cover by itself. For example, this cover can be placed, either with or without cover end caps, on suitable bus ducts, and secured to the ducts utilizing straps, such as "POLYSTRAPS" or "POLY-CORDS" which are well known to the trade. However, the utility of this weather protecting method is further enhanced with the use of an extender cover piece. This extender piece is similarly constructed to the main cover piece, being, for example, approximately 7' in length and 32" in width, with C shaped ends designed to interlock with the C shaped ends of the main cover piece. The extender piece has an upraised flange-along the top and sides of at least one end so as to interlock with the downwardly and inwardly projecting flange on each end of the main cover piece. When interjoined, the cover system of the invention provides a length adjustable overlapping design which eliminates any sealing rings, caulking, welding, or bolted connections which are susceptible to water intrusion.

To use the covers of the present invention they are simply placed on the top of existing equipment, and strapped to the bottom of the equipment using the aforementioned "POLYSTRAPS" or "POLY-CORDS". The installation does not require special tools or devices making set up extremely fast and easy. When two or more covers are employed the overlapping construction simply requires sliding units back and forth on each other for the design to fit. The system is designed to cover all hatches on the electrical substation roof sections and all joining assemblies when the substation is bolted together. All welded seams of the substation are covered, including along the top of the station where the sides meet the horizontal flat roof.

Thus it can be seen the electrical substation cover of the present invention provides a unique, new method for preventing water, snow, or ice from penetrating sensitive electrical equipment, resulting in the extension of the life of the original equipment, the prevention of costly failures and power outages, and the significant reduction in maintenance costs.

BRIEF DESCRIPTION OF THE DRAWINGS

FIG. 2 is a perspective view of one version of the main cover piece of the invention with internal support bars shown in dotted lines.

FIG. 4 is a perspective view of one version of the main cover piece of the invention shown with an end cap secured in place.

DETAILED DESCRIPTION

Figure 1:
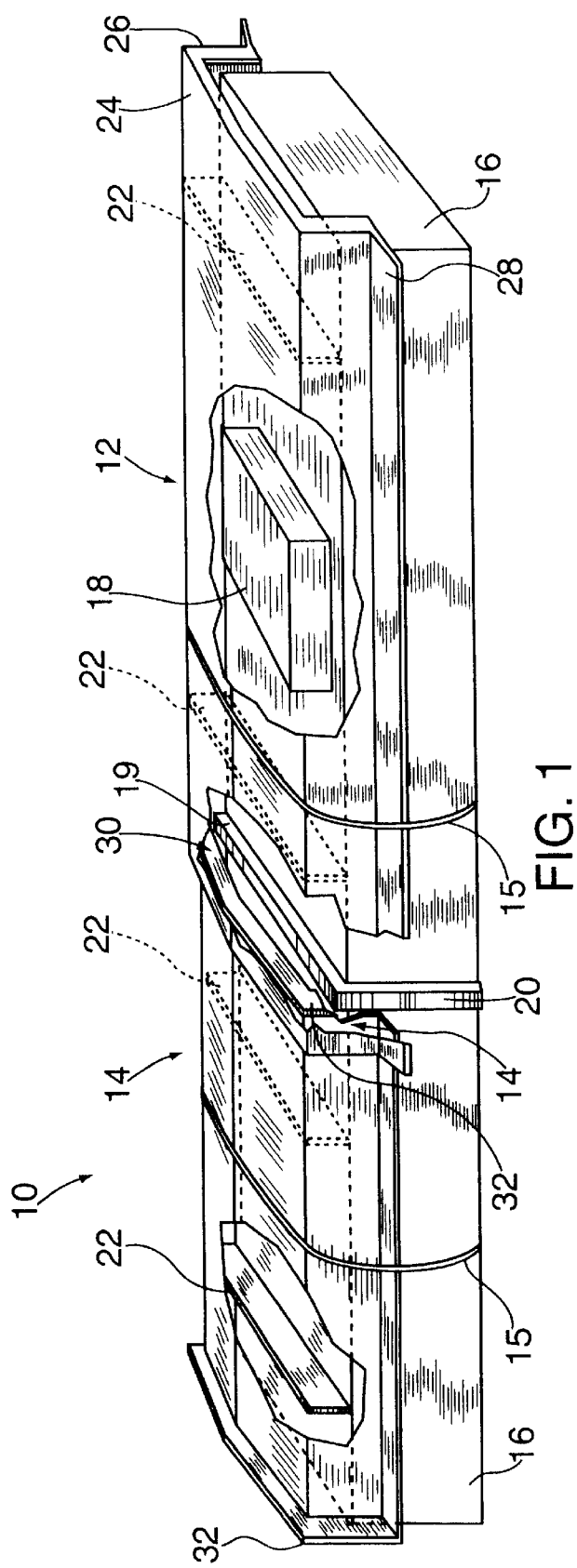
FIG. 1 is a partially broken away schematic, perspective representation of one version of the adjustable cover of the invention shown in place covering an electrical substation.

Turning now to the drawings wherein similar structures having the same function are denoted with the same numerals, in FIG. 1 a perspective view of one complete version of the invention 10 is shown. An electrical substation 16 such as, for example, a 13 kV bus duct or a 4 kV class "C" switchgear, is shown as having its top surface and parts of each side being covered by a main cover piece 12, and an interlocked, first version extender cover piece 14. The main cover piece 12 and the extender cover piece 14 are shown secured to an electrical substation 16 by means of straps 15 such as "POLYSTRAPS" or "POLY-CORDS". Typical structural components of a substation which protrude above the normally level top surface of the substation, such as a metal box 18, or a welded metal flange having a top section 19 and a side section 20 joining two sections of the substation together, are compensated for by support bars 22 (denoted in dotted lines) affixed within both the main cover piece 12 and the extender cover piece 14. These support bars are connected to and positioned perpendicular to the sides of each cover piece, typically adjacent each end of each cover piece. When the extender cover is in position, the lower surface of the support bars is positioned on the top surface of the substation. In addition to strengthening the cover pieces for handling and for resisting torsional forces due to wind at a site, the respective height of these support bars is selected to insure that the cover pieces are maintained substantially parallel to the plane of the top surface of the substation so that higher structural obtrusions on the top surface of a substation e.g., 18 or 19, do not tilt one or more cover pieces in a manner that would permit the entrance of water within the cover pieces.

Figure 3:
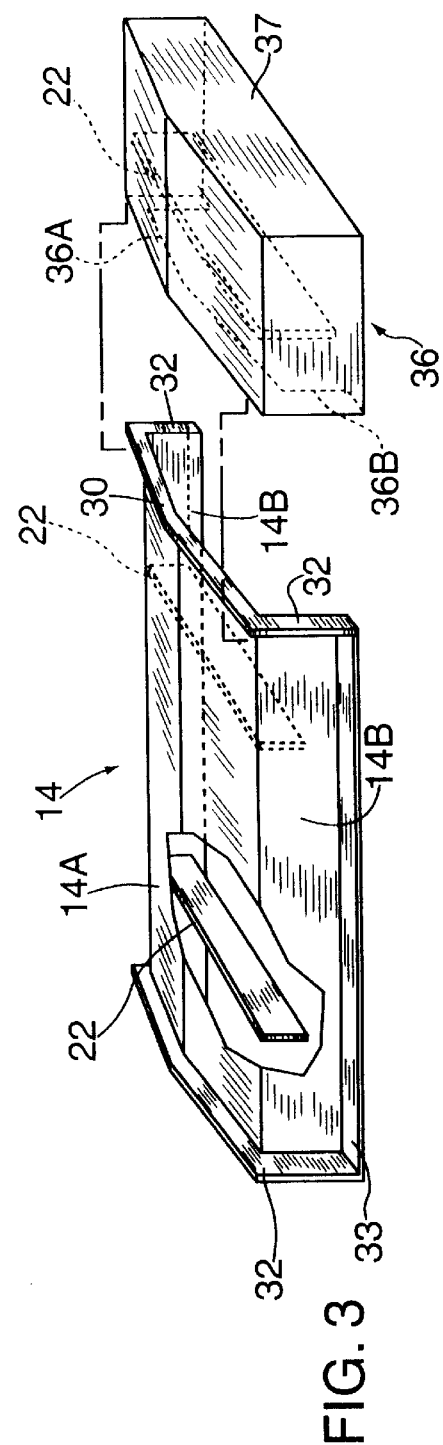
FIG. 3 is a perspective view of a first version of the extender cover piece of the invention with internal support bars shown in dotted lines.

The structure and interlocking relationship of the adjustable covers of the invention are best seen in FIGS. 2 and 3. In FIG. 2 a main cover piece 12 is shown having a top surface 12A, and left and right sides 12B. Each end of the main cover is defined by a C shaped opening 25 bound by the top and two sides. The top surface 12A of the main cover piece slopes gradually to the left and right from a center line 13 extending along the length of the top surface. At each end of the main cover piece there is an inwardly extending flange 24 positioned perpendicular to the top surface 12A which is confluent with inwardly extending flanges 26 positioned perpendicular to the sides 12B of the main cover piece. A side flange 28 extends outwardly from the base of each side 12B of the main cover piece, extending the full length of the main cover 12. This side flange has a slight pitch downward so as to facilitate water runoff away from the substation At least two support bars 22 are shown affixed to the sides 12B of the main cover, positioned perpendicular thereto.

In FIG. 3 a first version of an extender cover piece 14 is shown having a generally C-shaped structure similar to that of the main cover piece. However, at least at a first end of the extender piece there is a flange 30 extending outwardly from and perpendicular to the top surface 14A of the extender piece; and, an outwardly extending flange 32 perpendicular to the sides 14B of the extender piece confluent with flange 30. Again as in the case with the main cover piece at least a pair of support bars 22 are affixed to the sides, positioned perpendicular to the sides and adjacent typically near each end of the extender piece. The other end of the extender cover piece 14 is shown with a similar flange construction to facilitate joinder with an additional main cover such as 12, if desired.

A side flange 33 extends outwardly, also with a slight pitch downward, from the base of each side 14B and can extend the full length of the extender cover 14 except where a possible interference problem exists with the main cover side flanges, 26 (see the discussion below related to FIG. 6).

The dimensions of a main cover piece for installation, for example, on a 13 kV outdoor bus duct, can be approximately 11'8" in length, 37' in width, and 14" in height. The dimensions for an extender cover piece for this same application can be approximately 6'9" in length, 32" in width, and 12" in height. In both cases the covers would be molded in seamless fiberglass reinforced plastic, such as polyester, with an ultraviolet inhibitor such as ANSI-61 gel coat.

To use the adjustable covers of the invention a main cover piece 12 can be used by itself by simply having an operator place it on the top surface of the electrical substation, securing it in place by means of suitable straps. A pair of end caps (see FIG. 5) would be employed to seal each end.

Where additional length is required an extender cover piece 14 is interlocked beneath the main cover piece on the top surface of the substation. The inwardly directed flanges 24, 26 at the interlocking end of the cover piece overlap and cooperate with the outwardly directed flanges 30, 32 of the top surface 14A and of the sides 14B of the extender cover piece. The height of the support bars 22 in each of the cover pieces, is selected to insure respective protrusions are avoided and that the flanges on each cover piece do overlap. In this manner water from the elements is positively prevented from entering into the substation and thereby damaging sensitive components.

Figure 5:
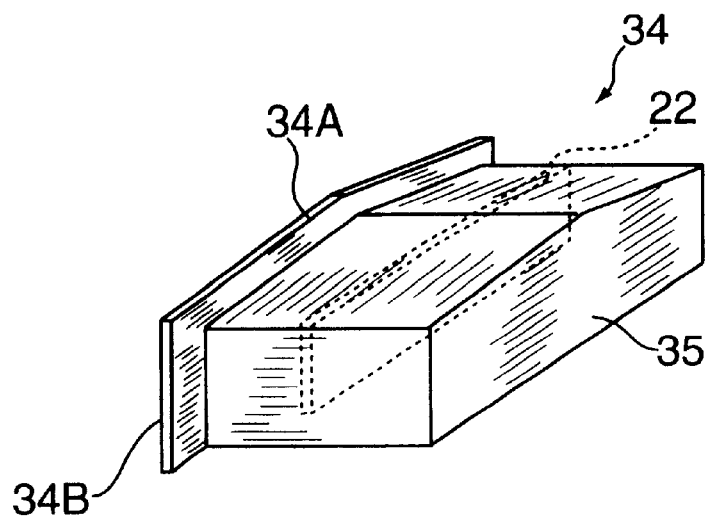
FIG. 5 is a schematic representation on one version of an end cap for the main cover piece of the invention.

As shown in FIGS. 4 and 5 an end cap 34 is employed to further prevent any water from gaining entrance to the electrical substation at the free end of each cover piece not interlocked with the other. To prevent water damage at this point a fiberglass reinforced plastic end cap 34 is fabricated having a free end similar to that of the extender cover piece 14, with an outwardly extending flange 34A at a top surface of the cap, and a confluent outwardly extending flange 34B at both sides of the generally C shaped opening of the cap. In use the cap would simply slip within the top and side flanges 24, 26 of the main cover. The end cap can have a support bar 22 similar to that of the extender piece 14, but having a closed second end 35 in contrast to the open ended structure of the extender piece.

A second version of a possible end cap is shown in FIG. 3. This cap 36 is designed to form a sealed enclosure with an extender piece 14. In this case inwardly extending flanges 36A extending perpendicularly from a generally C shaped first opening are confluent with flanges 36B extending inwardly from the sides of the cap. Similar to end cap 34, this end cap 36 can have a support bar 22 and a closed second end 37. In use this second version cap 36 would slip over the top and side flanges 30, 32 of the extender piece 14. Obviously a variety of other means can be utilized for closing off the free end of the main or extender cover piece, as, for example bolting a cover onto the flanges at the exposed end, extending the length of the flanges themselves to seal off the open area, and so on.

Figure 6:
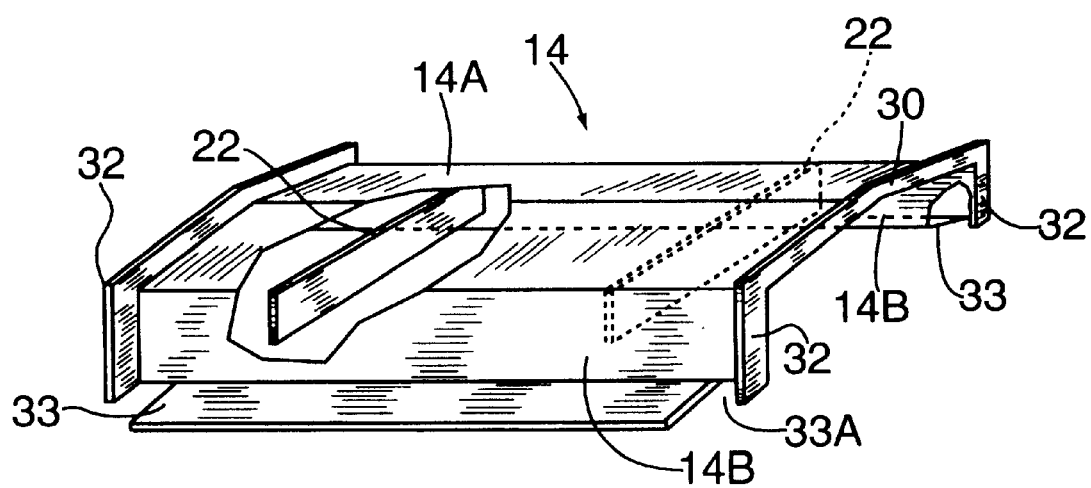
FIG. 6 is a perspective view of a second version of the extender cover piece of the invention with internal support bars shown in dotted lines.

FIG. 6 illustrates a second version 14C of the extender cover piece 14 depicted in FIG. 3. When the configuration of the particular electrical substation to be covered is known in advance, and therefore its overall dimensions including length, so that large scale adjustments of cover piece length will not be required, the extender cover piece can include modified side flanges 33B. The flanges 33B begin a spaced distance 33A away from the base of the extender piece outwardly extending side flange 32 at the C shaped openings, at both ends of the extender piece 14C. This permits some lateral adjustment when the main cover piece 12 is placed over the modified second version extender cover piece 14C.

Thus it can be seen that a significant new weather protecting cover system can be supplied for new or pre-existing electrical substations. The covers are installed quickly and reliably without utilizing special tools or techniques. The interlocking, adjustable method of the invention provides for installation of these length adjustable covers over a wide variety of existing electrical substations. Once in place, water is effectively eliminated from entering electrical substations providing significant performance enhancement while at the same time greatly reducing maintenance and inspection requirements.

While the particular design shown, in certain of its specifics, is directed to the assignee's 13 kV bus duct systems, different shapes and sizes will accommodate various similar equipment, e.g. assignee's 4 kV class "C" equipment, and others, and still be within the spirit and scope of the present invention as set forth in the following claims.

What is claimed is:

1. A water repellent, cover system for outdoor electrical substations, comprising:
   (a) a main cover, said main cover having a top surface and left and right side walls, said top surface and said cover side walls defining a generally "C" shaped opening at both ends of said main cover;
   (b) said "C" shaped opening at at least a first end of said main cover having a first flange, said first flange extending a spaced distance inwardly from said top surface and disposed substantially perpendicular thereto, said first flange being confluent with a second flange extending a spaced distance-inwardly from each of said left and right side walls, said second flange being disposed substantially perpendicular to each of said main cover side walls; and
   (c) means for maintaining a spaced relationship to a top surface of a respective outdoor, electrical substation, disposed between said main cover and said substation, so that when said main cover is placed on and covers the outdoor electrical substation, said means for maintaining said spaced relationship avoids protrusions jutting out from the top surface of the substation from interfering with the placement of said main cover over the substation, thereby maintaining said main cover in a planar relationship to said top surfaces, of said substation to prevent weather generated water from gaining access to said electrical substation.

2. The cover system according to claim 1 wherein said means for maintaining a spaced relationship include at least a pair of support bars affixed between said main cover side walls, said support bars having a predetermined first height, said main cover support bars including a lower surface for contacting said top surface of said substation when said main cover is in place on said top surface of said substation so that when said main cover is placed on and covers said top surface of said outdoor electrical substation said height of said support bars compensate for one of the protrusions jutting out from said top surface of said outdoor electrical substation.

3. The cover system according to claim 2, further comprising end caps to be secured to each end of said main cover.

4. The cover system according to claim 2 wherein said main cover is fabricated in a plastic material.

5. The main cover according to claim 4 wherein said main cover is fabricated in a fiberglass reinforced plastic material.

6. The water repellent main cover according to claim 2 further comprising an extender cover, said extender cover having a top surface and left and right side walls, said extender cover top surface and said extender cover side walls defining a generally "C" shaped opening at each end of the extender cover, said extender cover "C" shaped opening at at least a first end of said extender cover having a third flange, said third flange extending a spaced distance outwardly from said extender cover top surface, and substantially perpendicular thereto, said third flange being confluent with a fourth flange extending a spaced distance outwardly from each of said extender cover side walls and substantially perpendicular thereto, said extender cover having at least a pair of support bars affixed between said extender cover side walls, said extender cover support bars having a predetermined second height, said extender cover support bars including a lower surface for contacting said top surface of said substation when said extender cover is in place on said top surface of said substation, said extender cover being narrower in width than said main cover, said extender cover top surface, said extender cover side walls, and said third and fourth flanges being configured so that when it is required to have a greater length than the length of said main cover to cover said substation, said first end of said main cover is disposed over said first end of said extender cover, the predetermined first and second heights of said support bars affixed to said main cover and said extender cover dispose each of said covers above said top surface of said substation whereby the inwardly extending at least said first flange of said first end of said main cover overlap the outwardly extending at least said third flange of said first end of said extender cover, and whereby said main cover and said extender cover are maintained in substantially parallel planes to said top surface of said substation by avoiding protrusions jutting out from said top surface of said substation, said extender cover being slidably adjustable for differing length outdoor electrical substations, whereby said main cover top surface, said main cover side walls, and said first and second flanges at said main cover first end cooperate with said extender cover top surface, said extender cover side walls, and said third and fourth flanges at said extender cover first end to prevent weather generated water from gaining access to said outdoor electrical substation.

7. The water repellent cover system claimed in claim 6, further comprising a respective end cap adapted to cooperate with a second end of each of said main cover and said extender cover to further inhibit weather generated water from gaining access to said outdoor electrical substation.

8. The water repellent cover system according to claim 7 wherein the dimensions of said main cover and said extender cover and their respective support bars are adapted to provide weather protective coverage for 13 kV Bus Ducts.

9. The water repellent cover system according to claim 7 wherein the dimensions of said main cover and said extender cover and their respective support bars are adapted to provide weather protective coverage for 4 kV Class "C" Switchgear.

10. The cover system according to claim 6 wherein said extender cover is fabricated in a plastic material.

11. The cover system according to claim 10 wherein said extender cover is fabricated in a fiberglass reinforced plastic material.

12. The cover system according to claim 6 further comprising means for securing in place over said electrical substation.

13. The cover system according to claim 1 further comprising end caps to be secured to each end of said main cover.

14. The cover system according to claim 1 wherein said main cover is fabricated in a plastic material.

15. The cover system according to claim 14 wherein said main cover is fabricated in a fiberglass reinforced plastic material.

16. The cover system according to claim 1 further comprising means for securing said main cover in place over said substation.

17. An adjustable cover system for outdoor electrical substations, comprising:

(a) a main cover having a top surface, left and right side walls and a first and second end, said main cover being longer in length than in width, said main cover top surface and said main cover side walls defining a generally "C" shaped opening at each end of said main cover;

(b) said "C" shaped opening at at least said first end of said main cover having a first flange, said first flange extending a spaced distance inwardly from said main cover top surface and disposed perpendicular thereto, said first flange being confluent with a second flange extending a spaced distance inwardly from each of said left and right side walls, said second flange being disposed substantially perpendicular to each of said main cover side walls;

(c) said main cover having at least a first pair of support bars having a predetermined first height, said main cover support bars including a lower surface for contacting the top surface of the substation, when said main cover is in place on the top surface of the substation said support bars affixed between said main cover side walls, said support bars being positioned perpendicular to said main cover side walls;

(d) an extender cover having a top surface, left and right side walls and a first and second end, said extender cover top surface and said extender cover side walls defining a generally "C" shaped opening at each end of said extender cover, said extender cover "C" shaped opening at at least said first end of said extender cover having a third flange, said third flange extending a spaced distance outwardly from said extender cover top surface, and substantially perpendicular thereto, said third flange being confluent with a fourth flange extending a spaced distance outwardly from each of said extender cover side walls, and substantially perpendicular thereto; (e) said extender cover having at least a second pair of support bars having a predetermined second height, said extender cover support bars including a lower surface for contacting the top surface of the substation when said extender cover is in place on the top surface of the substation, said second pair of support bars affixed between said extender cover side walls, said second pair of support bars being positioned perpendicular to said extender cover side walls, said predetermined first and second height of said main cover support bars and said extender cover support bars respectively, exceeding the height above the top surface of said electrical substation of any protrusions jutting therefrom, thereby maintaining said main cover and said extender cover in a linear parallel plane with said top surface of said electrical substation;

(f) said extender cover being narrower in width than said main cover; said extender cover top surface, said extender cover side walls, and said third and fourth extender cover flanges being configured so that when said adjustable cover is placed over said top surface of said electrical substation, and said respective support bars are disposed upon the top surface of the substation said first end of said main cover is positioned over said first end of said extender cover, the predetermined first and second heights of said support bars affixed to said main cover and said extender cover dispose each of said covers above the top surface of the substation whereby the inwardly extending at least said first flange of said first end of said main cover overlap the outwardly extending at least said third flange of the first end of said extender cover, and whereby said main cover and said extender cover are maintained in substantially parallel planes to the top surface of the substation by avoiding said protrusions jutting out from the top surface of the substation, said extender cover being slidably adjustable within said main cover for a differing length of said electrical substation, whereby said main cover top surface, said main cover side walls, and said first and second flanges at said first end of said main cover cooperate with said extender cover top surface, said extender cover side walls, and said third and fourth flanges at said extender cover first end to prevent weather generated water from gaining access to said electrical substation.

18. An adjustable cover system for outdoor electrical substations according to claim 17 further comprising means for securing said main cover and extender cover in place over said electrical substation.

19. The adjustable cover system for outdoor electrical substations according to claim 17, further comprising end caps to be secured to the exposed second ends of said main cover and said extender cover, to further inhibit weather generated water from gaining access to said outdoor electrical substation after said cover system is positioned on said top surface of said electrical substation.

20. The adjustable cover system for outdoor electrical substations according to claim 17 wherein said cover system is adapted to provide weather protective coverage for 13 kV Bus Ducts.

21. The adjustable cover for outdoor electrical substations according to claim 17 wherein said cover system is adapted to provide weather protective coverage for 4 kV Class "C" Switchgear.

22. The adjustable cover system for outdoor electrical substations according to claim 17 wherein said main cover and said extender cover are fabricated in a plastic material.

23. The adjustable cover system for outdoor electrical substations according to claim 22 wherein each said main and extender cover is fabricated in a fiberglass reinforced plastic material.

24. A cover for outdoor electrical substations, comprising:
(a) a main cover having a top surface, left and right side walls, and a first and second end, said main cover being longer in length than in width, said main cover top surface and said main cover side walls defining a generally "C" shaped opening at each end of said main cover;
(b) said "C" shaped opening at at least said first end of said main cover having a first flange, said first flange extending a spaced distance inwardly from said main cover top surface and disposed perpendicular thereto, said first flange being confluent with a second flange extending a spaced distance inwardly from each of said left and right side walls, said second flange being disposed substantially perpendicular to each of said main cover side walls: (c) said left and right main cover side walls each having a third flange extending outwardly from the base of each of said side walls, said third flange extending the length of both of said side walls of said main cover;
(d) said main cover having at least a first pair of support bars having a predetermined first height, said main cover support bars including a lower surface for contacting the top surface of the substation when said main cover is in place on the top surface of the substation, said support bars affixed between said main cover side walls, said support bars being positioned perpendicular to said main cover side walls; (e) an extender cover having a top surface, left and right side walls, and a first and second end, said extender cover top surface and said extender cover side walls defining a generally "C" shaped opening at each end of said extender cover, said extender cover "C" shaped opening at at least said first end of said extender cover having a fourth flange, said fourth flange extending a spaced distance outwardly from said extender cover top surface, and substantially perpendicular thereto, said fourth flange being confluent with a fifth flange extending a spaced distance outwardly from each of said extender cover side walls, and substantially perpendicular thereto; (f) said extender cover side walls each having a sixth flange extending outwardly from the base of each of said side walls, said sixth flange ending a spaced distance away from said "C" shaped opening ends of said extender cover;

(g) said extender cover having at least a second pair of support bars having a predetermined second height, said extender cover support bars including a lower surface for contacting the top surface of the substation when said extender cover is in place on the top surface of the substation, said second pair of support bars affixed between said extender cover side walls, said second pair of support bars being positioned perpendicular to said extender cover side walls, said predetermined first and second height of said main cover support bars and said extender cover support bars respectively exceeding the height above the top surface of said electrical substation of any protrusions jutting therefrom, thereby maintaining said main cover and said extender cover in a linear parallel plane with said top surface of said electrical substation;

(h) said extender cover being narrower in width than said main cover, said extender cover top surface, said extender cover side walls, and said fourth and fifth extender cover flanges being configured so that when said cover comprising said main cover and said extender cover, is placed over said top surface of said electrical substation, and said respective support bars are disposed upon the top surface of the substation, said first end of said main cover is positioned over said first end of said extender cover, the predetermined first and second heights of said support bars affixed to said main cover and said extender cover disposing each of said covers above the top surface of the substation whereby the inwardly extending at least said first flange of said first end of said main cover overlap the outwardly extending at least said third flange of the first end of said extender cover, and whereby said main cover and said extender cover are maintained in substantially parallel planes to the top surface of the substation by avoiding the protrusions jutting out from the top surface of the substation, said extender cover being slidably adjustable within said main cover for a differing length of said electrical substation, whereby said main cover top surface, said main cover side walls, and said first and second flanges at said first end of said main cover cooperate with said extender cover top surface, said extender cover side walls, and said fourth and fifth flanges at said extender cover first end to prevent weather generated water from gaining access to said electrical substation, said extender cover being slidably adjustable within said main cover by an operator over a distance between said first end of said extender cover and each said sixth flange on said extender cover defined by said spaced distance ending of each said sixth flange away from said "C" shaped opening ends of said extender cover, whereby said main cover top surface, said main cover side walls, and said first and second flanges at said first end of said main cover cooperate with said extender cover top surface, said extender cover side walls, and said fourth and fifth flanges at said extender cover first end, and said third and sixth flanges to prevent weather generated water from gaining access to said electrical substation.

25. A cover for outdoor electrical substations according to claim 24 further comprising means for securing said main cover and extender cover in place over said electrical substation.

26. A cover for outdoor electrical substations according to claim 24 fisher comprising end caps to be secured to exposed ends of said main cover and said extender cover to further inhibit weather generated water from gaining access to said outdoor electrical substation after said cover system is positioned on said top surface of said electrical substation.

27. A cover for outdoor electrical substations according to claim 24 wherein said cover is adapted to provide weather protective coverage for 13 kV Bus Ducts.

28. The cover for outdoor electrical substations according to claim 24 wherein said cover is adapted to provide weather protective coverage for 4 kV Class "C" Switchgear.

* * * * *

Adverse Decisions In Interference

Patent No. 5,194,662, Siegbert Brand, Uwe Kardorff, Reinhard Kirstgen, Bernd Mueller, Klaus Oberdorf, Hubert Sauter, Gisela Lorenz, Eberhard Ammermann, Christoph Kuenast, Albrecht Harreus, O-BENZYLOXIME ETHERS AND CROP PROTECTION AGENTS CONTAINING THESE COMPOUNDS, Interference No. 103,743, final judgment adverse to the patentees rendered February 15, 2001, as to claims 1-6 and 9.

*(Official Gazette April 17, 2001)*

UNITED STATES PATENT AND TRADEMARK OFFICE
CERTIFICATE OF CORRECTION

PATENT NO. : 6,194,662
DATED : February 27, 2001
INVENTOR(S) : Donald C. Smith, Cranford, NJ It is certified that error appears in the above-identified patent and that said Letters Patent is hereby corrected as shown below:

At Column 6, line 25, remove the hyphen between the words "distance" and "inwardly".

At Column 6, line 38, change the word "surfaces" to --surface--.

At Column 6, line 38, remove the comma after the word "surfaces" and insert the comma after the word "substation" on line 39.

At Column 12, line 2, change the word "fisher" to --further--.

Signed and Sealed this

Fifth Day of June, 2001

*Attest:*

*Attesting Officer*

NICHOLAS P. GODICI
*Acting Director of the United States Patent and Trademark Office*